US012679055B2

(12) United States Patent
Mayabb et al.

(10) Patent No.: US 12,679,055 B2
(45) Date of Patent: Jul. 14, 2026

(54) METHOD FOR REPAIRING COMPOSITE LAMINATE MATERIAL COMPONENT

(71) Applicant: RTX Corporation, Farmington, CT (US)

(72) Inventors: Patrick B. Mayabb, Eaton Rapids, MI (US); Jesse L Os, Hampden, MA (US); Oleg Ivanov, Granby, CT (US); Derek W. Anderson, Cromwell, CT (US); Brian K. Holland, Mason, MI (US)

(73) Assignee: RTX Corporation, Farmington, CT (US)

( * ) Notice: Subject to any disclaimer, the term of this patent is extended or adjusted under 35 U.S.C. 154(b) by 136 days.

(21) Appl. No.: 18/381,041

(22) Filed: Oct. 17, 2023

(65) Prior Publication Data

US 2025/0121570 A1    Apr. 17, 2025

(51) Int. Cl.
B29C 73/04 (2006.01)
B29C 73/24 (2006.01)

(52) U.S. Cl.
CPC ............ B29C 73/04 (2013.01); B29C 73/245 (2013.01)

(58) Field of Classification Search
None
See application file for complete search history.

(56) References Cited

U.S. PATENT DOCUMENTS

| | | | |
|---|---|---|---|
| 5,447,411 | A | 9/1995 | Curley |
| 8,403,624 | B2 | 3/2013 | Xie |
| 8,475,615 | B2 | 7/2013 | Deleris |

| | | | |
|---|---|---|---|
| 10,030,540 | B2 | 7/2018 | Molnar |
| 10,239,300 | B2 | 3/2019 | Joslyn |
| 11,104,086 | B2 | 8/2021 | Wee |
| 11,319,833 | B2 | 5/2022 | Karafillis |
| 11,718,050 | B2 | 8/2023 | Hafenrichter |
| 2007/0079920 | A1 | 4/2007 | Holland |

(Continued)

FOREIGN PATENT DOCUMENTS

| | | |
|---|---|---|
| CN | 109278372 B | 3/2021 |
| FR | 3010652 B1 | 8/2016 |

OTHER PUBLICATIONS

EP Search Report for EP Patent Application No. 24207026.6 dated Mar. 28, 2025.

*Primary Examiner* — Abbas Rashid
*Assistant Examiner* — Adrianna N Konves
(74) *Attorney, Agent, or Firm* — Getz Balich LLC

(57) ABSTRACT

A method for repairing a composite laminate component includes removing a first portion of the composite laminate component. The composite laminate component extends between and to a first component side and a second component side. The composite laminate component includes a first plurality of layers having a first sequential arrangement from the first component side to the second component side, and the first portion includes the first plurality of layers. The method further includes preparing a second portion for the composite laminate component. The second portion extends between and to a first portion side and a second portion side. The second portion includes a second plurality of layers having a second sequential arrangement from the first portion side to the second portion side. The second sequential arrangement is different than the first sequential arrangement. The method further includes positioning the second portion on the composite laminate component and curing the second portion.

16 Claims, 6 Drawing Sheets

(56)        References Cited

U.S. PATENT DOCUMENTS

| | | | |
|---|---|---|---|
| 2011/0315303 | A1 | 12/2011 | Bird |
| 2018/0311933 | A1 | 11/2018 | Hasan |
| 2021/0317751 | A1 | 10/2021 | Mee |

400

402 — REMOVE A PORTION OF A COMPOSITE LAMINATE COMPONENT

404 — PREPARE A REPAIR PORTION FOR THE COMPOSITE LAMINATE COMPONENT

406 — POSITION THE REPAIR PORTION ON THE COMPOSITE LAMINATE COMPONENT

408 — CURE THE REPAIR PORTION

410 — APPLY ONE OR MORE FINISHING OPERATIONS TO THE REPAIRED COMPOSITE LAMINATE COMPONENT

METHOD FOR REPAIRING COMPOSITE LAMINATE MATERIAL COMPONENT

BACKGROUND

1. Technical Field

This disclosure relates generally to composite laminate material components and, more particularly, to methods for repairing composite laminate material components.

2. Background Information

Composite laminate material components for machinery, such as an aircraft gas turbine engine, may be susceptible to wear and damage during machinery operation. Replacement of these composite laminate material components may be expensive. Various systems and methods for repairing composite laminate material components are known in the art. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a method for repairing a composite laminate component includes removing a first portion of the composite laminate component. The composite laminate component extends between and to a first component side and a second component side. The composite laminate component includes a first plurality of layers having a first sequential arrangement from the first component side to the second component side, and the first portion includes the first plurality of layers. The method further includes preparing a second portion for the composite laminate component. The second portion extends between and to a first portion side and a second portion side. The second portion includes a second plurality of layers having a second sequential arrangement from the first portion side to the second portion side. The second sequential arrangement is different than the first sequential arrangement. The method further includes positioning the second portion on the composite laminate component with the second plurality of layers at the first plurality of layers and curing the second portion with the second portion positioned on the composite laminate component.

In any of the aspects or embodiments described above and herein, each of the first sequential arrangement and the second sequential arrangement may include opposing outer layers and intermediate layers extending between and to the opposing outer layers. The intermediate layers of the first sequential arrangement may be different than the intermediate layers of the second sequential arrangement.

In any of the aspects or embodiments described above and herein, the opposing outer layers may be different than the intermediate layers for each of the first sequential arrangement and the second sequential arrangement.

In any of the aspects or embodiments described above and herein, the intermediate layers of the first sequential arrangement may include one or more carbon fiber layers and one or more aramid fiber layers.

In any of the aspects or embodiments described above and herein, the intermediate layers of the second sequential arrangement may include a plurality of aramid fiber layers.

In any of the aspects or embodiments described above and herein, the intermediate layers of second sequential arrangement may not include a carbon fiber layer.

In any of the aspects or embodiments described above and herein, removing the first portion may include abrading each of the first plurality of layers to form a first scarf joint of the composite laminate component.

In any of the aspects or embodiments described above and herein, the second portion may include a second scarf joint. Positioning the second portion on the composite laminate component with the second plurality of layers at the first plurality of layers may include placing an adhesive layer between and contacting the first scarf joint and the second scarf joint.

In any of the aspects or embodiments described above and herein, the first sequential arrangement and the second sequential arrangement may have a same number of layers.

In any of the aspects or embodiments described above and herein, the first portion may form one or more mounting holes of the composite laminate component.

In any of the aspects or embodiments described above and herein, the method may further include forming the one or more mounting holes in the second portion subsequent to curing the second portion.

According to another aspect of the present disclosure, a method for repairing a composite laminate component includes removing a damaged portion of the composite laminate component. The composite laminate component extends between and to a first component side and a second component side. The composite laminate component includes a first plurality of layers having a first sequential arrangement from the first component side to the second component side. The composite laminate component forms a plurality of mounting holes extending through the first plurality of layers, and the damaged portion includes the first plurality of layers and at least one of the plurality of mounting holes. The method further includes preparing a repair portion for the composite laminate component. The repair portion extends between and to a first portion side and a second portion side. The repair portion includes a second plurality of layers having a second sequential arrangement from the first portion side to the second portion side. The second sequential arrangement is different than the first sequential arrangement. The method further includes positioning the second portion on the composite laminate component with the second plurality of layers at the first plurality of layers and forming the at least one of the plurality of mounting holes in the repair portion.

In any of the aspects or embodiments described above and herein, each of the first sequential arrangement and the second sequential arrangement may include opposing outer layers and intermediate layers extending between and to the opposing outer layers. The intermediate layers of the first sequential arrangement may be different than the intermediate layers of the second sequential arrangement.

In any of the aspects or embodiments described above and herein, the opposing outer layers may be different than the intermediate layers for each of the first sequential arrangement and the second sequential arrangement.

In any of the aspects or embodiments described above and herein, the intermediate layers of the first sequential arrangement may include one or more carbon fiber layers and one or more aramid fiber layers.

In any of the aspects or embodiments described above and herein, the intermediate layers of the second sequential arrangement may include a plurality of aramid fiber layers.

According to another aspect of the present disclosure, a method for repairing a composite laminate component includes removing a first portion of the composite laminate component. The composite laminate component extends between and to a first component side and a second component side. The composite laminate component includes a first plurality of layers including one or more carbon fiber ply layers and one or more aramid fiber ply layers. The first plurality of layers has a first sequential arrangement from the first component side to the second component side. The first portion includes the first plurality of layers. The method further includes preparing a second portion for the composite laminate component. The second portion extends between and to a first portion side and a second portion side. The second portion includes a second plurality of layers including a plurality of aramid fiber ply layers. The second plurality of layers has a second sequential arrangement from the first portion side to the second portion side. The second sequential arrangement is different than the first sequential arrangement. The method further includes positioning the second portion on the composite laminate component with the one or more carbon fiber ply layers disposed at a respective one or more of the plurality of aramid fiber ply layers and curing the second portion with the second portion positioned on the composite laminate component.

In any of the aspects or embodiments described above and herein, removing the first portion may include abrading each of the first plurality of layers to form a first scarf joint of the composite laminate component.

In any of the aspects or embodiments described above and herein, the second portion may include a second scarf joint. Positioning the second portion on the composite laminate component with the second plurality of layers at the first plurality of layers may include placing an adhesive layer between and contacting the first scarf joint and the second scarf joint.

In any of the aspects or embodiments described above and herein, the first sequential arrangement and the second sequential arrangement may have a same number of layers.

The present disclosure, and all its aspects, embodiments and advantages associated therewith will become more readily apparent in view of the detailed description provided below, including the accompanying drawings.

DETAILED DESCRIPTION

Figure 1:
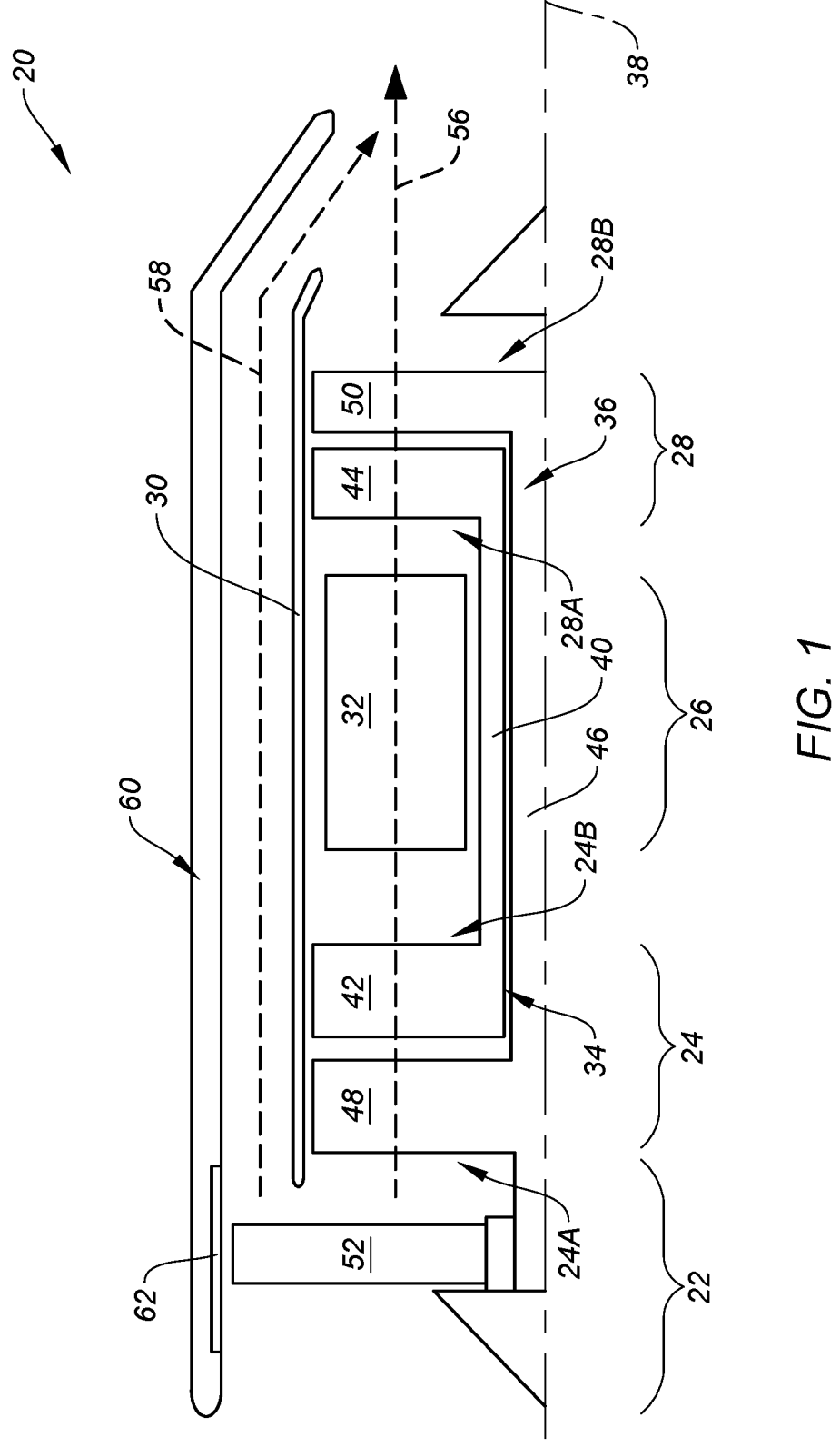
FIG. 1 illustrates a cutaway, side view of a gas turbine engine for an aircraft propulsion system, in accordance with one or more embodiments of the present disclosure.

FIG. 1 schematically illustrates a gas turbine engine 20. The gas turbine engine 20 of FIG. 1 is a multi-spool turbofan gas turbine engine for an aircraft propulsion system. The gas turbine engine 20 of FIG. 1 includes a fan section 22, a compressor section 24, a combustor section 26, a turbine section 28, and an engine static structure 30. The compressor section 24 of FIG. 1 includes a low-pressure compressor (LPC) 24A and a high-pressure compressor (HPC) 24B. The combustor section 26 includes a combustor 32 (e.g., an annular combustor). The turbine section 28 includes a high-pressure turbine (HPT) 28A and a low-pressure turbine (LPT) 28B.

Components of the fan section 22, the compressor section 24, and the turbine section 28 form a first rotational assembly 34 (e.g., a high-pressure spool) and a second rotational assembly 36 (e.g., a low-pressure spool) of the gas turbine engine 20. The first rotational assembly 34 and the second rotational assembly 36 are mounted for rotation about an axial centerline 38 (e.g., a rotational axis) of the gas turbine engine 20 relative to the engine static structure 30.

The first rotational assembly 34 includes a first shaft 40, a bladed first compressor rotor 42 for the high-pressure compressor 24B, and a bladed first turbine rotor 44 for the high-pressure turbine 28A. The first shaft 40 interconnects the bladed first compressor rotor 42 and the bladed first turbine rotor 44.

The second rotational assembly 36 includes a second shaft 46, a bladed second compressor rotor 48 for the low-pressure compressor 24A, and a bladed second turbine rotor 50 for the low-pressure turbine 28B. The second shaft 46 interconnects the bladed second compressor rotor 48 and the bladed second turbine rotor 50. The second shaft 46 may additionally be directly or indirectly coupled to a bladed fan rotor 52 for the fan section 22. For example, the second shaft 46 may be coupled to the bladed fan rotor 52 (e.g., an input shaft of the bladed fan rotor 52) by a reduction gear assembly configured to drive the bladed fan rotor 52 at a reduced rotational speed relative to the second shaft 46. The first shaft 40 and the second shaft 46 are concentric and configured to rotate about the axial centerline 38. The present disclosure, however, is not limited to concentric configurations of the first shaft 40 and the second shaft 46.

The engine static structure 30 may include one or more engine cases, cowlings, bearing assemblies, and/or other non-rotating structures configured to house and/or support (e.g., rotationally support) components of the gas turbine engine 20 sections 22, 24, 26, 28.

In operation of the gas turbine engine 20 of FIG. 1, ambient air is directed through the fan section 22 and into a core flow path 56 (e.g., an annular flow path) and a bypass flow path 58 (e.g., an annular flow path) by rotation of the bladed fan rotor 52. Airflow along the core flow path 56 is compressed by the low-pressure compressor 24A and the high-pressure compressor 24B, mixed and burned with fuel in the combustor 32, and then directed through the high-pressure turbine 28A and the low-pressure turbine 28B. The bladed first turbine rotor 44 and the bladed second turbine rotor 50 rotationally drive the first rotational assembly 34 and the second rotational assembly 36, respectively, in response to the combustion gas flow through the high-pressure turbine 28A and the low-pressure turbine 28B. The bypass flow path 58 may be formed by an annular bypass duct between (e.g., radially between) the engine static structure 30 and an outer aircraft propulsion system housing 60 (e.g., a nacelle) for the gas turbine engine 20. The housing 60 of FIG. 1 includes a fan case 62 of the fan section 22. The fan case 62 is disposed outward (e.g., radially outward) of the bladed fan rotor 52. The fan case 62 circumscribes the bladed fan rotor 52.

Figure 2:
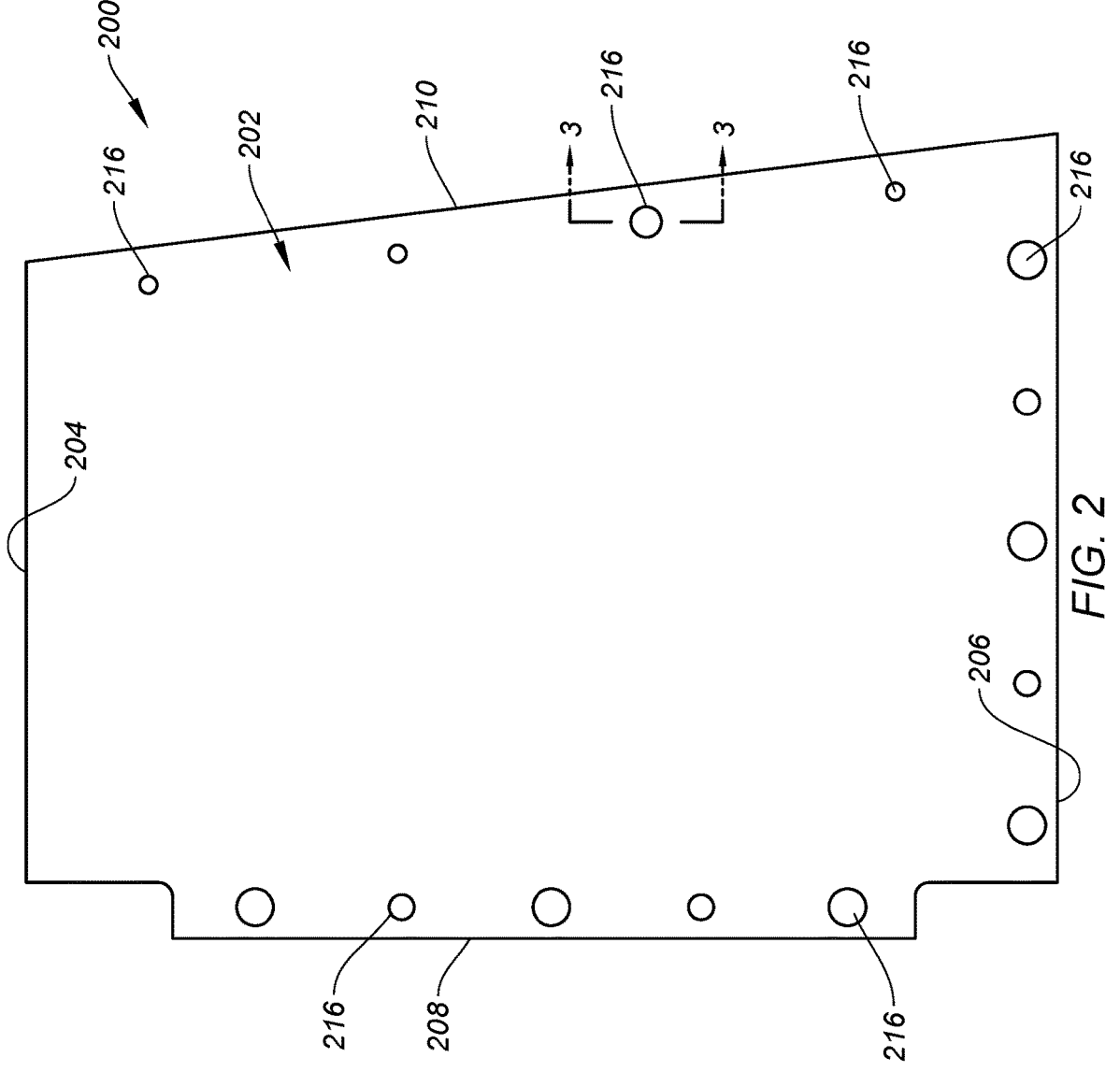
FIG. 2 illustrates a composite laminate panel configured for use with the gas turbine engine of FIG. 1, in accordance with one or more embodiments of the present disclosure.
Figure 3:
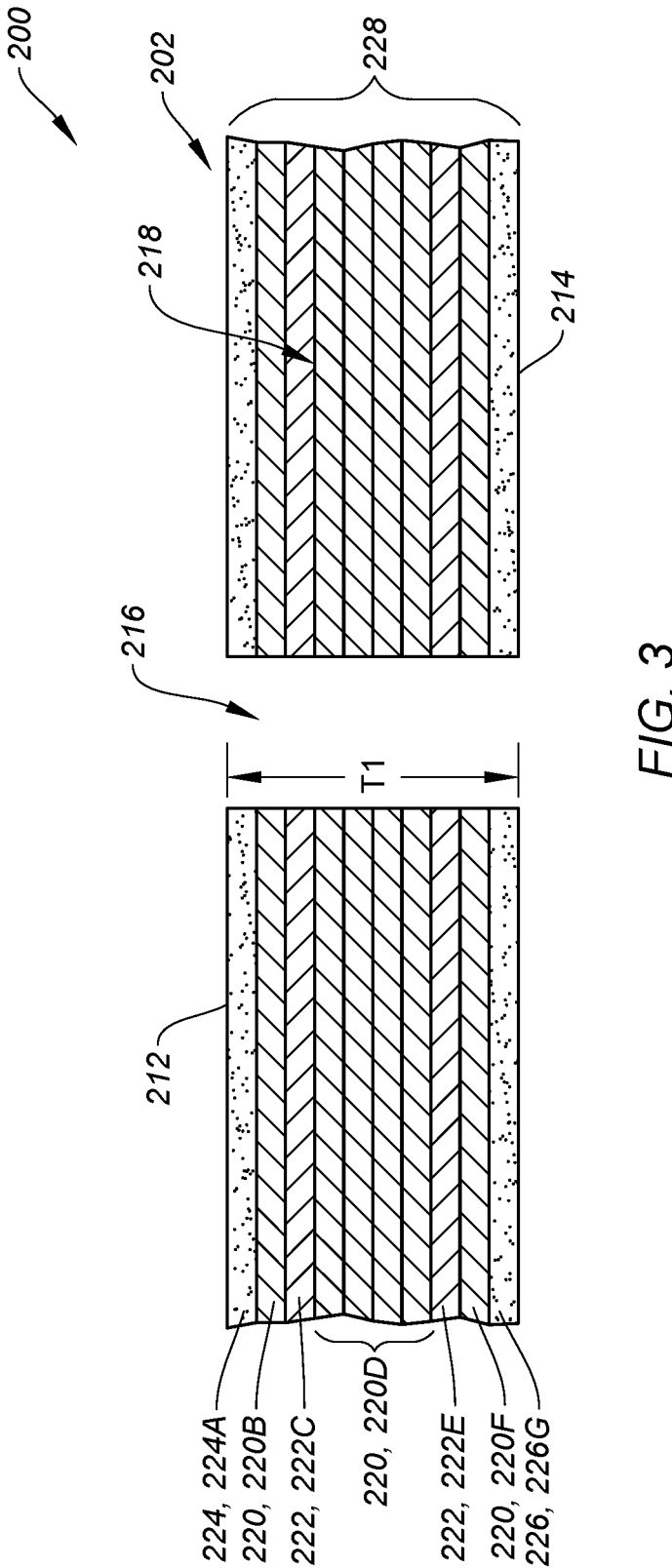
FIG. 3 illustrates a cross-sectional view of the composite laminate panel of FIG. 2 taken along Line 3-3 of FIG. 2, in accordance with one or more embodiments of the present disclosure.

FIGS. 2 and 3 illustrate an exemplary component 200 which may be repaired in accordance with aspects of the present disclosure. The component 200 of FIGS. 2 and 3 is a composite laminate panel 202. The composite laminate panel 202 of FIGS. 2 and 3 may be used, for example, to form a portion of the fan case 54 (see FIG. 1). The present disclosure is not limited to the composite laminate panel 202 of FIGS. 2 and 3, and aspects of the present disclosure are equally applicable to other composite laminate panel configurations and applications. FIG. 2 illustrates a front view of the composite laminate panel 202. FIG. 3 illustrates a cross-sectional view of the composite laminate panel 202 taken along Line 3-3 of FIG. 2.

The composite laminate panel 202 of FIGS. 2-3 extends between and to a first longitudinal end 204 of the composite laminate panel 202 and a second longitudinal end 206 of the composite laminate panel 202. The composite laminate panel 202 of FIGS. 2-3 extends between and to a first lateral end 208 of the composite laminate panel 202 and a second lateral end 210 of the composite laminate panel 202. The composite laminate panel 202 of FIGS. 2-3 extends between and to a first side 212 of the composite laminate panel 202 and a second side 214 of the composite laminate panel 202. The composite laminate panel 202 has a thickness T1 extending between and to the first side 212 and the second side 214. The composite laminate panel 202 forms a plurality of fastener mounting holes 216 extending between and to the first side 212 and the second side 214 (e.g., through the thickness T1). The mounting holes 216 are configured to facilitate mounting of the composite laminate panel 202 to one or more other components of the engine static structure 30 or its fan case 54 using a respective plurality of mechanical fasteners (see FIG. 1). The composite laminate panel 202 is illustrated in FIGS. 2 and 3 as a substantially flat panel, however, the composite laminate panel 202 may alternatively be curved or otherwise shaped to form the fan case 54.

The composite laminate panel 202 of FIGS. 2 and 3 is formed by a plurality of layers 218. The layers 218 may extend between and to or substantially between and to the first longitudinal end 204 and the second longitudinal end 206. The layers 218 may extend between and to or substantially between and to the first lateral end 208 and the second lateral end 210. The layers 218 may extend between and to the first side 212 and the second side 214 to form the thickness T1. The layers 218 may further form the mounting holes 216. For example, each of the mounting holes 216 may be formed through each of the layers 218. The layers 218 include one or more aromatic polyamide fiber ply layers 220 and one or more carbon fiber ply layers 222. The layers 218 may include additional layers such as, but not limited to, one or more ceramic fabric layers 224 (e.g., an epoxy-resin-impregnated aluminum borosilicate glass fabric layer) and/or one or more fiberglass fabric layers 226 (e.g., an epoxy-resin-impregnated fiberglass fabric layer).

The aromatic polyamide ("aramid") fiber ply layers 220 each include an arrangement of aramid fibers impregnated by an epoxy resin. The aramid fibers may have a unidirectional orientation, a random orientation, a bidirectional orientation, a multi-directional orientation, or the like, and the present disclosure is not limited to any particular orientation of the arrangement of aramid fibers for the aramid fiber ply layers 220. An example of the aramid fibers includes those sold under the trade name KEVLAR (E.I. Du Pont De Nemours and Co. of Wilmington, DE)).

The carbon fiber ply layers 222 each include an arrangement of carbon fibers impregnated by an epoxy resin. The carbon fibers may have a unidirectional orientation, a random orientation, a bidirectional orientation, a multi-directional orientation, or the like, and the present disclosure is not limited to any particular orientation of the arrangement of carbon fibers for the carbon fiber ply layers 222.

The composite laminate panel 202 has a sequential arrangement 228 of the layers 218 from the first side 212 to the second side 214. FIG. 3 illustrates an exemplary configuration of the sequential arrangement 228 for the composite laminate panel 202 in which the layers 218 are sequentially arranged from the first side 212 to the second side 214 as a ceramic fabric layer 224A, 224, an aramid fiber ply layer 220B, 220, a carbon fiber ply layer 222C, 222, a plurality of aramid fiber ply layers 220D, 220, a carbon fiber ply layer 222E, 222, an aramid fiber ply layer 220F, 220, and a fiberglass fabric layer 226G, 226. The ceramic fabric layer 224A, 224 forms the first side 212. The fiberglass fabric layer 226G, 226 forms the second side 214. The ceramic fabric layer 224A, 224 and the fiberglass fabric layer 226G, 226 thereby form outer layers of the sequential arrangement 228, however, the present disclosure is not limited to the use of any particular material later for the outer layers of the sequential arrangement 228 of the layers 218. The carbon fiber ply layers 222C, 222E, 222 and the aramid fiber ply layers 220B, 220D, 220F, 220 may be understood to form intermediate layers of the sequential arrangement 228 of the layers 218. The intermediate layers of the sequential arrangement 228 extend between and to the opposing outer layers. The sequential arrangement 228 of FIG. 3 is provided to facilitate the description of aspects of the present disclosure, and the present disclosure is not limited to the foregoing exemplary configuration of the sequential arrangement 228 of FIG. 3.

As the component 200 (e.g., the composite laminate panel 202) is used, for example, during operation of the gas turbine engine 20 (see FIG. 1), the materials of the component 200, such as the layers 218, may become worn. For example, the composite laminate panel 202 may be susceptible to wear in proximity to the mounting holes 216. Processes for repairing the composite laminate panel 202 may encounter a number of difficulties. One difficulty, for example, is that a suitable repair for the composite laminate panel 202 may ensure there are no ply layer drop-offs created in proximity to the mounting holes 216 during the repair. A ply layer drop-off may be formed, for example, when tapering ply layers of a composite laminate panel during a repair process includes terminating ply layers at different locations. The use of ply layer drop-offs during a repair process may result in significant savings in material, however, ply layer drop-offs also cause discontinuities within the composite laminate panel, thereby introducing structural complications to the composite laminate panel. For example, the presence of ply layer drop-offs in proximity to the mounting holes 216 may create stress concentrations at (e.g., on, adjacent, or proximate) the mounting holes 216, thereby increasing the likelihood of component failure. Another difficulty, for example, is that for composite laminate panels including a mixture of different layers (e.g., layers made from different materials such as carbon fiber ply layers and aramid fiber ply layers), a choice of which ply layer overlaps another ply layer has a substantial affect on the way structural loads are transferred from ply layer to ply layer.

Figure 4:
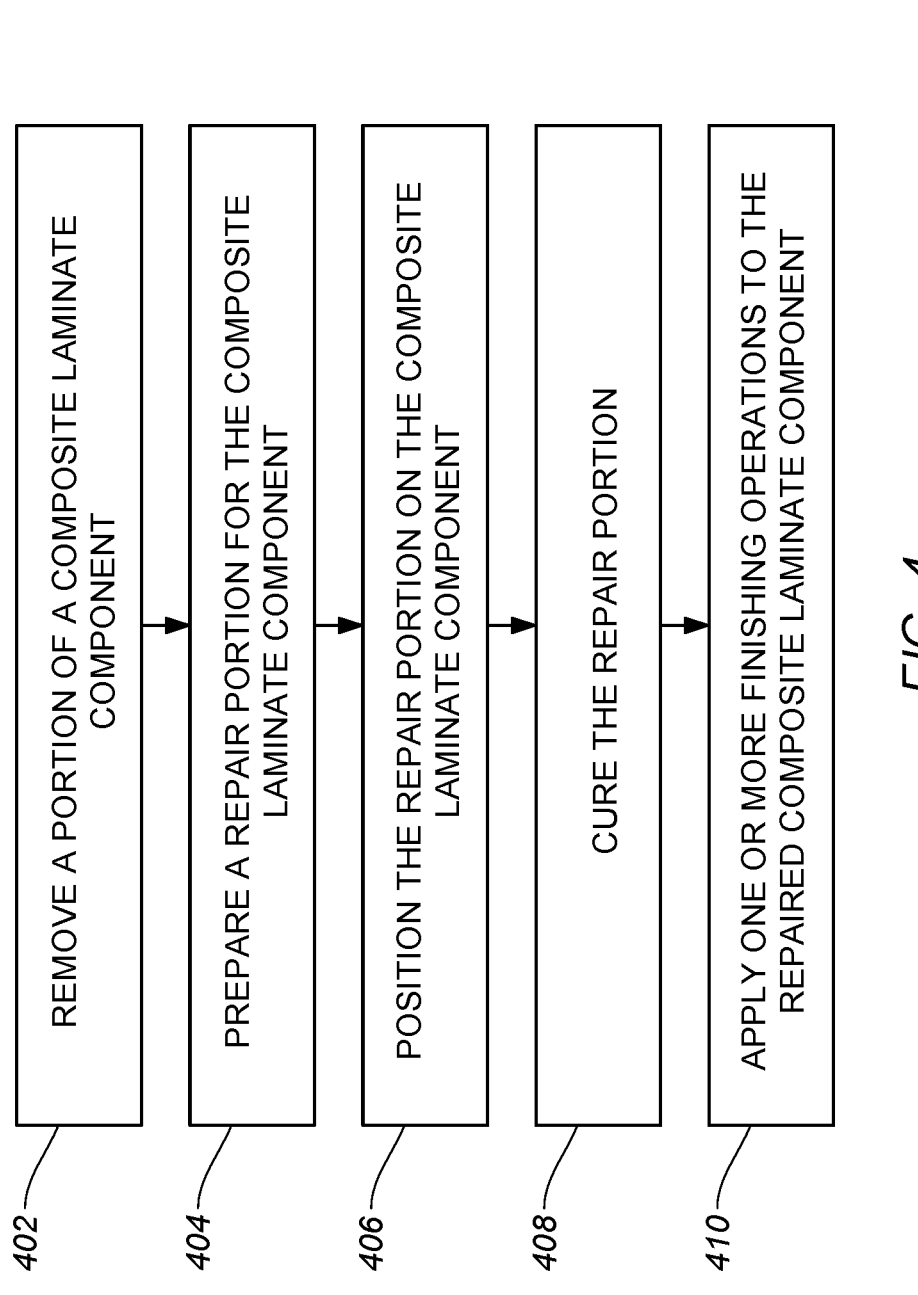
FIG. 4 illustrates a block diagram depicting a method for repairing a composite laminate component, in accordance with one or more embodiments of the present disclosure.

Referring to FIGS. 4-7, a method 400 for repairing a composite laminate component, such as the component 200 (e.g., the composite laminate panel 202), is provided. FIG. 4 illustrates a flowchart for the method 400. The method 400 will be described herein with respect to the composite laminate panel 202. However, it should be understood that the method 400 is not limited to use with the particular composite laminate panel 202 described herein. Unless otherwise noted herein, it should be understood that the steps of method 400 are not required to be performed in the specific sequence in which they are discussed below and, in some embodiments, the steps of method 400 may be performed separately or simultaneously.

Figure 5:
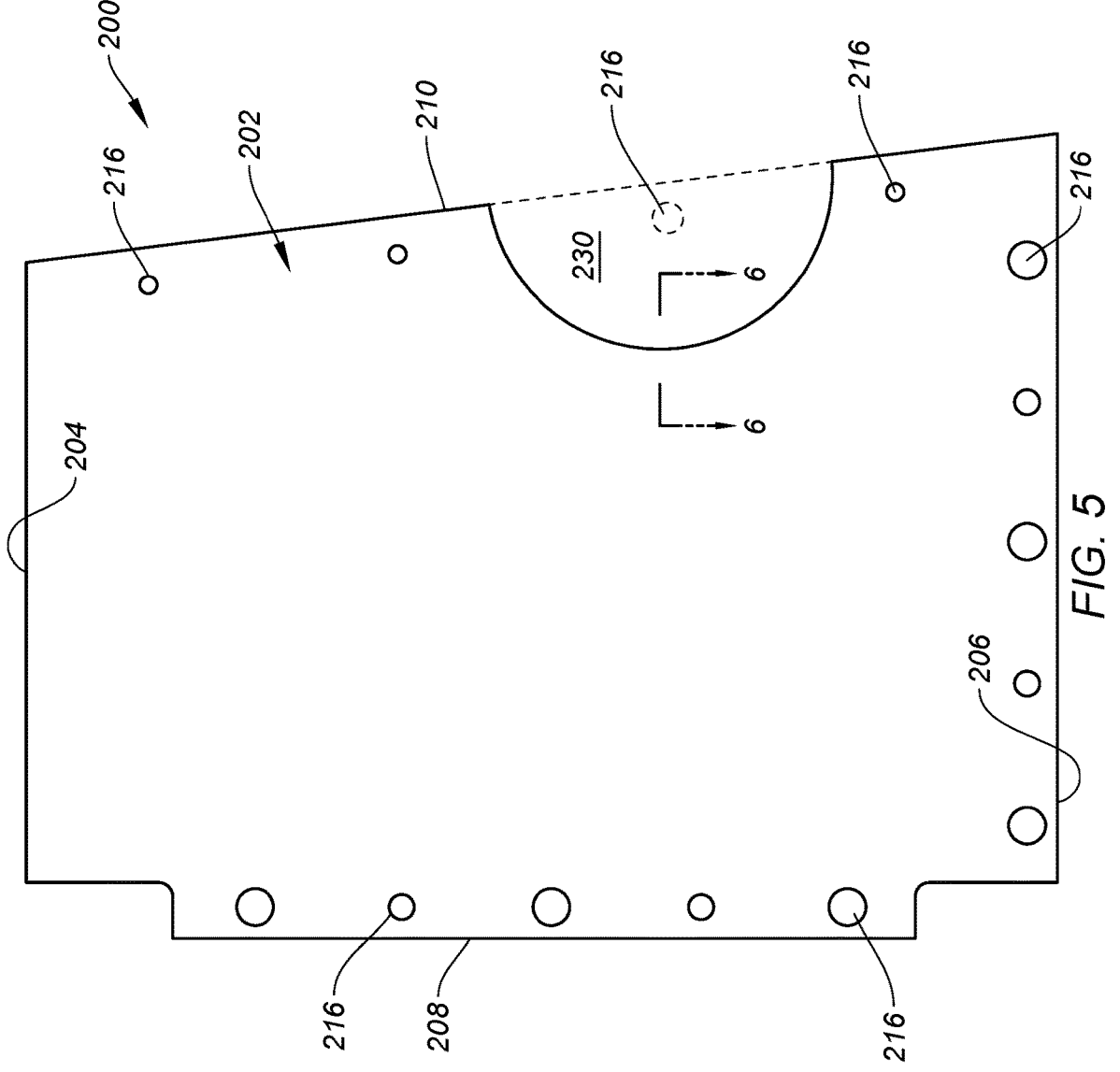
FIG. 5 illustrates the composite laminate panel of FIG. 2 at a stage of the method of FIG. 4, in accordance with one or more embodiments of the present disclosure.
Figures 6, 7:
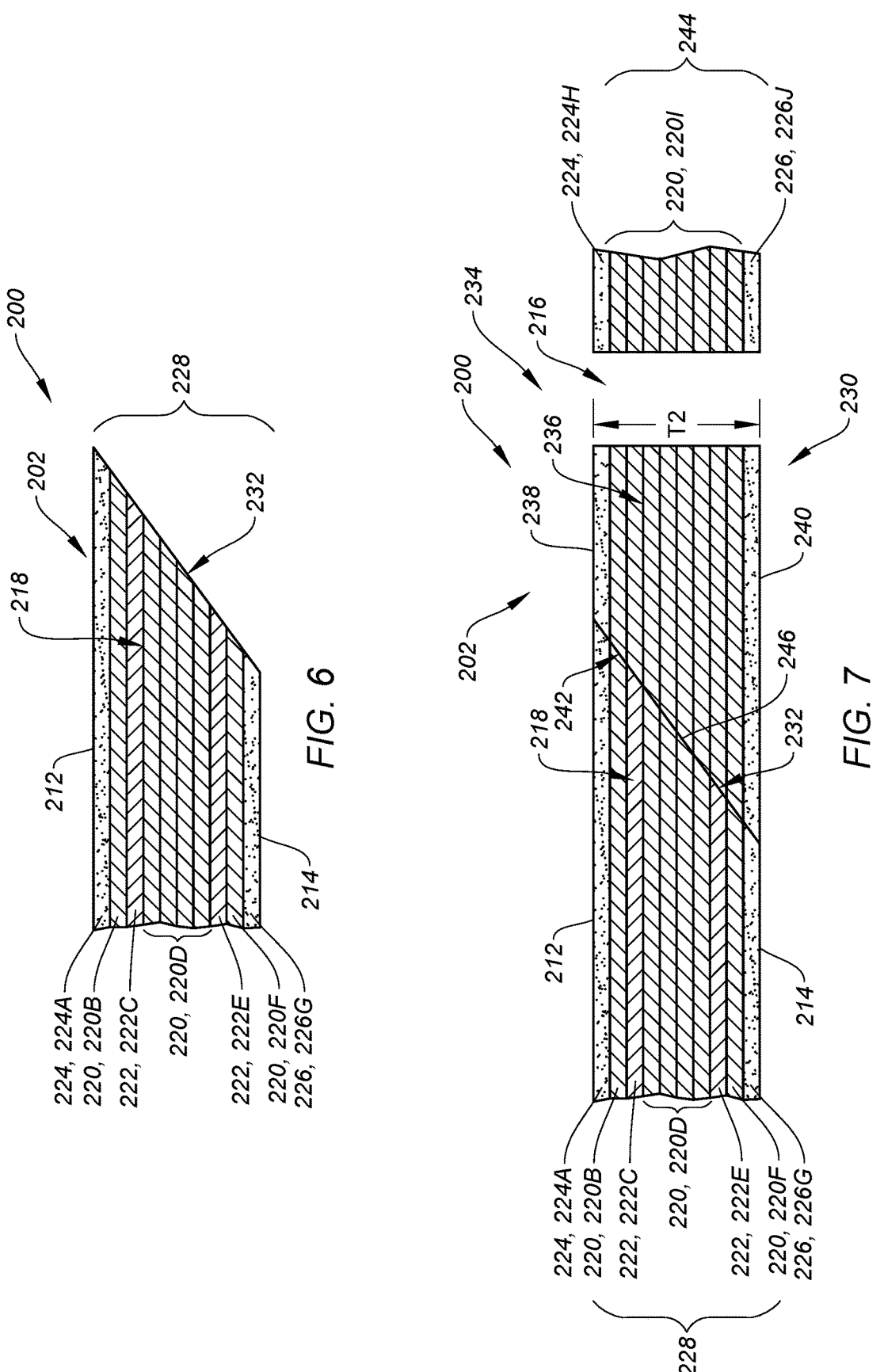
FIG. 6 illustrates a cross-sectional view of the composite laminate panel of FIG. 5 taken along Line 6-6 of FIG. 5, in accordance with one or more embodiments of the present disclosure.
FIG. 7 illustrates a cutaway view of the composite laminate panel of FIG. 5 with a repair portion, in accordance with one or more embodiments of the present disclosure.

Step 402 includes removing a portion 230 of the composite laminate panel 202 as shown, for example, in FIGS. 5 and 6. FIG. 5 illustrates a front view of the composite laminate panel 202 with the removed portion 230. FIG. 6 illustrates a cross-sectional view of the composite laminate panel 202 taken along Line 6-6 of FIG. 5. Step 402 may include abrading the portion 230 to remove damaged material of the composite laminate panel 202, for example, at (e.g., on, adjacent, or proximate) one or more of the mounting holes 216. Step 402 may include abrading one, more than one, or each of the layers 218 to remove the portion 230. The layers 218 may be abraded to form a scarf joint 232 such as, but not limited to, a tapered scarf joint, a stepped scarf joint, or another suitable joint configuration for repairing the composite laminate panel 202. The layers 218 of FIG. 6, for example, form the scarf joint 232 with a straight-tapered scarf joint configuration. While FIG. 6 shows each of the layers 218 abraded to form the scarf joint 232, in some cases, one or both of the outer layers of the sequential arrangement 228 (e.g., the ceramic fabric layer 224A, 224 and/or the fiberglass fabric layer 226G, 226) may not be abraded, cut, or otherwise removed from the composite laminate panel 202, for example, if there is no or substantially no damage to the respective outer layers.

Step 404 includes preparing a repair portion 234 for the composite laminate panel 202 to replace the removed portion 230. In particular, step 404 includes preparing a plurality of layers 236 of the repair portion 234. The layers 236 extend between and to a first side 238 of the repair portion 234 and a second side 240 of the repair portion 234 to form a thickness T2 of the repair portion 234. The repair portion 234 and its layers 236 may further form one or more of the mounting holes 216. Alternatively, one or more of the mounting holes 216 may be subsequently formed in the repair portion 234, as will be discussed in further detail. The layers 236 are cut and assembled together to form the repair portion 234. The layers 236 may be cut and assembled to form a scarf joint 242 matching the scarf joint 232. One or more of the layers 236 may be prepreg material layers including a reinforcing fiber or fabric material pre-impregnated with a resin or other polymer matrix.

The repair portion 234 has a sequential arrangement 244 of the layers 236 from the first side 238 to the second side 240, which sequential arrangement 244 is different (e.g., includes layers having different fiber materials) than the sequential arrangement 228 of the composite laminate panel 202. FIG. 7 illustrates an exemplary configuration of the sequential arrangement 244 for the repair portion 234 in which the layers 236 are sequentially arranged from the first side 238 to the second side 240 as a ceramic fabric layer 224H, 224, a plurality of aramid fiber ply layers 220I, 220, and a fiberglass fabric layer 226J, 226. Similar to the composite laminate panel 202, the ceramic fabric layer 224H, 224 may form the first side 238 and the fiberglass fabric layer 226J, 226 may form the second side 240. The ceramic fabric layer 224H, 224 and the fiberglass fabric layer 226J, 226 thereby form outer layers of the sequential arrangement 244, however, the present disclosure is not limited to the use of any particular material for the outer layers of the sequential arrangement 244 of the layers 236. Moreover, the sequentially arrangement 244 may not include one or both of the outer layers, for example, where one or both of the outer layers of the sequential arrangement 228 are not removed, as previously discussed. Each of the intermediate layers of the sequential arrangement 244 may have a same fiber material (e.g., aramid fibers). The aramid fiber ply layers 220I, 220 (e.g., only the aramid fiber ply layers 220I, 220) may be understood to form intermediate layers of the sequential arrangement 244 of the layers 236. The intermediate layers of the sequential arrangement 244 extend between and to the opposing outer layers. In the example of FIG. 7, the sequential arrangement 244 of the repair portion 234 matches the sequential arrangement 228 of the composite laminate panel 202 except that the carbon fiber ply layers 222C, 222E, 222 of the layers 218 are replaced with corresponding layers of the aramid fiber ply layers 220I, 220. The present disclosure, however, is not limited to the foregoing exemplary configuration of the repair portion 234 and its sequential arrangement 244 of the layers 236. The layers 218 and the layers 236 may include a same number of layers.

Step 406 includes positioning the repair portion 234 on the composite laminate panel 202, for example, at the location of the removed portion 230 (see FIG. 5). Step 406 may include placing an adhesive layer 246 between the composite laminate panel 202 and the repair portion 234. For example, the adhesive layer 246 (e.g., a film adhesive layer) may extend along the scarf joint 232 and the scarf joint 242 between and contacting the composite laminate panel 202 and the repair portion 234. With the repair portion 234 positioned on the composite laminate panel 202, the first side 238 is disposed at (e.g., on, adjacent, or proximate) the first side 212 and the second side 240 is disposed at (e.g., on, adjacent, or proximate) the second side 214.

Step 408 includes curing the repair portion 234 with the repair portion 234 positioned on the composite laminate panel 202 (see step 406). Step 408 may include vacuum sealing the composite laminate panel 202 with the positioned repair portion 234 in a vacuum bag. The assembly of the composite laminate panel 202 and the repair portion 234 in the vacuum bag may be disposed in an autoclave or other thermal curing assembly at a predetermined temperature and pressure to cure the repair portion 234 and the adhesive layer 246 on the composite laminate panel 202.

Step 410 includes applying one or more finishing operations to the repaired composite laminate panel 202 (e.g., the composite laminate panel 202 including the cured repair portion 234). The repair portion 234 may be trimmed, abraded, sanded, polished, and/or otherwise machined or shaped to return the repaired composite laminate panel 202 to its design shape and configuration. One or more of the mounting holes 216 for the repair portion 234 may be trimmed or drilled. Surfaces (e.g., machined surfaces) of the repair portion 234 may be cleaned and coated with an epoxy sealant, for example, to protect the aramid fiber ply layers 220 from moisture.

By using the aramid fiber ply layers 220I for the sequential arrangement 244 (e.g., for the intermediate layers of the sequential arrangement 244) without the carbon fiber ply layers 222C, 222E, 222 of the composite laminate panel 202, the repair portion 234 facilitates sufficient load capability for the repaired composite laminate panel 202 while also reducing the complexity and cost of the repair. For example, each time a roll of a prepreg fiber ply layer (e.g., an aramid fiber ply layer or a carbon fiber ply layer) is taken out of an associated storage freezer, the roll loses time towards its expiration time, at which point the prepreg fiber ply material of the roll can no longer be used. By reducing the quantity of different types of prepreg fiber ply materials which may be needed for a composite laminate panel repair (e.g., aramid fiber ply material instead of both aramid fiber ply material and carbon fiber ply material), cost savings may be realized through bulk use of fewer types of prepreg fiber ply materials and reduced likelihood of prepreg fiber ply materials reaching their expiration date.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A method for repairing a composite laminate component, the method comprising:

removing a first portion of the composite laminate component, the composite laminate component extends between and to a first component side and a second component side, the composite laminate component includes a first plurality of layers having a first sequential arrangement from the first component side to the second component side, and the first portion includes the first plurality of layers;

preparing a second portion for the composite laminate component, the second portion extends between and to a first portion side and a second portion side, the second portion includes a second plurality of layers having a second sequential arrangement from the first portion side to the second portion side, and the second sequential arrangement is different than the first sequential arrangement;

positioning the second portion on the composite laminate component with the second plurality of layers at the first plurality of layers; and curing the second portion with the second portion positioned on the composite laminate component;

wherein each of the first sequential arrangement and the second sequential arrangement includes opposing outer layers and intermediate layers extending between and to the opposing outer layers; and wherein the intermediate layers of the first sequential arrangement comprise at least one layer having a first fiber material and at least one layer having a second fiber material, and each of the intermediate layers of the second sequential arrangement have the second fiber material.

2. The method of claim 1, wherein the opposing outer layers are different than the intermediate layers for each of the first sequential arrangement and the second sequential arrangement.

3. The method of claim 1, wherein the intermediate layers of the first sequential arrangement include one or more carbon fiber layers and one or more aramid fiber layers.

4. The method of claim 3, wherein the intermediate layers of the second sequential arrangement include a plurality of aramid fiber layers.

5. The method of claim 3, wherein the intermediate layers of second sequential arrangement do not include a carbon fiber layer.

6. The method of claim 1, wherein removing the first portion includes abrading each of the first plurality of layers to form a first scarf joint of the composite laminate component.

7. The method of claim 6, wherein the second portion includes a second scarf joint, and wherein positioning the second portion on the composite laminate component with the second plurality of layers at the first plurality of layers includes placing an adhesive layer between and contacting the first scarf joint and the second scarf joint.

8. The method of claim 1, wherein the first sequential arrangement and the second sequential arrangement have a same number of layers.

9. The method of claim 1, wherein the first portion forms one or more mounting holes of the composite laminate component.

10. The method of claim 9, further comprising forming the one or more mounting holes in the second portion subsequent to curing the second portion.

11. A method for repairing a composite laminate component, the method comprising:

removing a damaged portion of the composite laminate component, the composite laminate component extends between and to a first component side and a second component side, the composite laminate component includes a first plurality of layers having a first sequential arrangement from the first component side to the second component side, the composite laminate component forms a plurality of mounting holes extending through the first plurality of layers, and the damaged portion includes the first plurality of layers and at least one of the plurality of mounting holes;

preparing a repair portion for the composite laminate component, the repair portion extends between and to a first portion side and a second portion side, the repair portion includes a second plurality of layers having a second sequential arrangement from the first portion side to the second portion side, and the second sequential arrangement is different than the first sequential arrangement;

positioning the repair portion on the composite laminate component with the second plurality of layers at the first plurality of layers; and forming the at least one of the plurality of mounting holes in the repair portion;

wherein each of the first sequential arrangement and the second sequential arrangement includes opposing outer layers and intermediate layers extending between and to the opposing outer layers, and the intermediate layers of the first sequential arrangement are different than the intermediate layers of the second sequential arrangement; and wherein the intermediate layers of the first sequential arrangement include one or more carbon fiber layers and one or more aramid fiber layers and each of the intermediate layers of the second sequential arrangement is an aramid fiber layer.

12. The method of claim 11, wherein the opposing outer layers are different than the intermediate layers for each of the first sequential arrangement and the second sequential arrangement.

13. A method for repairing a composite laminate component, the method comprising:

removing a first portion of the composite laminate component, the composite laminate component extends between and to a first component side and a second component side, the composite laminate component includes a first plurality of layers including one or more carbon fiber ply layers and one or more aramid fiber ply layers, the first plurality of layers has a first sequential arrangement from the first component side to the second component side, and the first portion includes the first plurality of layers;

preparing a second portion for the composite laminate component, the second portion extends between and to a first portion side and a second portion side, the second portion includes a second plurality of layers with each layer of the second plurality of layers comprising an aramid fiber ply layer, the second plurality of layers has a second sequential arrangement from the first portion side to the second portion side, and the second sequential arrangement is different than the first sequential arrangement;

positioning the second portion on the composite laminate component with the one or more carbon fiber ply layers disposed at a respective one or more of the plurality of aramid fiber ply layers; and curing the second portion with the second portion positioned on the composite laminate component.

14. The method of claim 13, wherein removing the first portion includes abrading each of the first plurality of layers to form a first scarf joint of the composite laminate component.

15. The method of claim 14, wherein the second portion includes a second scarf joint, and wherein positioning the second portion on the composite laminate component with the second plurality of layers at the first plurality of layers includes placing an adhesive layer between and contacting the first scarf joint and the second scarf joint.

16. The method of claim 13, wherein the first sequential arrangement and the second sequential arrangement have a same number of layers.

* * * * *